United States Patent [19]
Owen

[11] 3,864,337
[45] Feb. 4, 1975

[54] 8-SUBSTITUTED CARBOCYANINE DYES, SUBSTITUTED VINYL CYANINE DYE INTERMEDIATES, PROCESSES FOR PREPARATION AND NOVEL PHOTOGRAPHIC ELEMENTS

[75] Inventor: John R. Owen, Rochester, N.Y.

[73] Assignee: Eastman Kodak Company, Rochester, N.Y.

[22] Filed: Sept. 30, 1971

[21] Appl. No.: 185,453

[52] U.S. Cl............ 260/240.6, 96/134, 260/240 J, 260/240.65, 260/240.8, 260/283 S, 260/296 H, 260/297 R, 260/299, 260/304, 260/306.7, 260/307 D, 260/309.2
[51] Int. Cl............................................ C09b 23/06
[58] Field of Search.................... 260/240.6, 240.61

[56] References Cited
UNITED STATES PATENTS
2,735,770  2/1956  Brooker et al............... 260/240.6 X
3,598,595  8/1971  Mee et al..................... 260/240.6 X OTHER PUBLICATIONS
Hamer, The Cyanine Dyes and Related Compounds, p. 731, Interscience Publishers (1964).

Primary Examiner—John D. Randolph
Attorney, Agent, or Firm—M. R. Chipaloski

[57] ABSTRACT

New $\beta$-alkoxyvinyl, $\beta$-aryloxyvinyl and $\beta$-acyloxyvinyl substituted carbocyanine dye intermediates and processes for preparing them are provided. Also provided are new 8-amino and 8-amido substituted carbocyanine dyes and processes for preparing these dyes. New processes are provided for preparing 8-thio and 8-formyl substituted carbocyanine dyes. Novel photographic elements contain light-sensitive silver halide spectrally sensitized with the 8-amino and 8-amido carbocyanine dyes.

9 Claims, No Drawings

8-SUBSTITUTED CARBOCYANINE DYES, SUBSTITUTED VINYL CYANINE DYE INTERMEDIATES, PROCESSES FOR PREPARATION AND NOVEL PHOTOGRAPHIC ELEMENTS

This invention relates to novel methods for preparing novel dye intermediates and to novel methods for preparing both novel and known 8-substituted carbocyanine dyes.

It is known that certain heterocyclic quaternary ammonium salts containing a β-diarylaminovinyl group or a β-(N-acyl)anilidovinyl group in the reactive position can be used as intermediates for the formation of unsymmetrical carbocyanine dyes. It is also known that these dyes can be prepared from heterocyclic nitrogen-containing compounds containing a formylmethylene group in the reactive position. See British Pat. No. 466,268.

However, these intermediates are not useful in the preparation of 8-amino and 8-amido unsymmetrical carbocyanine dyes from quaternary salts having substituted in the reactive position such groups as anilinomethyl, acetanilidomethyl, and methylanilinomethyl, and the like. The anilino-vinyl and the acetanilidovinyl salts fail to react with the substituted methyl quaternary salts mentioned immediately above and form only undesired by-products. The formylmethylene derivatives require acetic anhydride or other similar acidic solvents as a reaction medium and this causes undesired acylation of the anilino group of anilinomethyl substituted compounds.

It is also known that 9-alkyl- or arylthio substituted carbocyanine dyes can be reacted with a primary amine to produce 9-secondary amino substituted carbocyanine dyes. These dyes can be further reacted with an acylating agent such as acetic anhydride to produce the corresponding 9-amido substituted carbocyanine dyes. See Kendall, et al., U.S. Pat. No. 2,637,729, issued May 5, 1953 and Brooker, et al., U.S. Pat. No. 2,735,770, issued Feb. 21, 1956.

8-Aryl mercapto substituted carbocyanine dyes are disclosed in Roth, et al., Canadian Pat. No. 638,460, issued Mar. 20, 1962. It, however, is not possible to use the 8-arylthio substituted dyes of Roth et al in the reaction of Kendall, et al., or Brooker, et al., to yield the corresponding 8-amino and 8-amido substituted carbocyanine dyes. This is because of the greater steric hindrence and the lower reactivity of the 8- and 10-position relative to the 9-position of carbocyanine dyes.

Accordingly, it is an object of our invention to provide intermediates for preparing 8-substituted carbocyanine dyes.

It is another object of our invention to provide methods for preparing these intermediates.

It is still another object of our invention to provide 8-substituted carbocyanine dyes.

It is a further object of our invention to provide methods of preparing 8-substituted carbocyanine dyes.

Other objects of this invention will be apparent from the disclosure herein and the appended claims.

These and other objects are attained in accordance with the following described embodiments of my invention.

In accordance with one embodiment of this invention, novel dye intermediates are provided having the formula:

I. 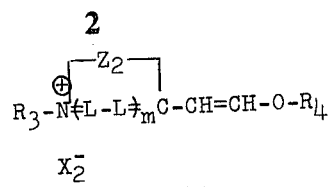

wherein:

a. m represents 0 or 1;

b. each L represents a methine group (e.g., $-CH=$, $-C(CH_3)=$, etc.);

c. $R_3$ represents an alkyl group (including substituted alkyl) having from 1 to 18 carbon atoms and preferably a lower alkyl group having from 1 to 4 carbon atoms (e.g., methyl, ethyl, propyl, isopropyl, butyl, secondary-butyl, isobutyl, tert-butyl, pentyl, hexyl, octyl, decyl, dodecyl, octadecyl), an aralkyl group, preferably aryl lower alkyl containing from 1 to 4 carbon atoms in the alkyl moiety (e.g., benzyl, β-phenethyl, ω-phenbutyl, etc.), a sulfoalkyl group, preferably sulfo lower alkyl containing from 1 to 4 carbon atoms in the alkyl moiety (e.g., β-sulfoethyl, γ-sulfopropyl, γ-sulfobutyl, Δ-sulfobutyl, etc.), a carboxyalkyl group, preferably a carboxy lower alkyl containing from 1 to 4 carbon atoms in the alkyl moiety (e.g., β-carboxyethyl, γ-carboxypropyl, Δ-carboxybutyl, etc.), a sulfatoalkyl group, preferably a sulfato lower alkyl containing from 1 to 4 carbon atoms in the alkyl moiety (e.g., β-sulfatoethyl, γ-sulfatopropyl, Δ-sulfatobutyl, etc.), an alkoxyalkyl group, preferably lower alkoxy lower alkyl containing from 1 to 4 carbon atoms in both the alkoxy and alkyl moieties (e.g., β-methoxyethyl, γ-methoxypropyl, Δ-propoxybutyl, etc.), an acyloxyalkyl group, preferably acyloxy lower alkyl containing from 1 to 4 carbon atoms in the alkyl moiety (e.g., acetyloxyethyl, propanoyloxyethyl, butanoyloxybutyl, benzoyloxyethyl, tolyloxypropyl, etc.), an alkoxycarbonylalkyl group, preferably lower alkoxy carbonyl lower alkyl containing 1 to 4 carbon atoms in both the alkoxy and alkyl moieties (e.g., β-methoxycarbonylethyl, Δ-ethoxycarbonylbutyl, β-butoxycarbonylethyl, etc.), an alkenyl group, preferably lower alkenyl containing 2 to 4 carbon atoms (e.g., allyl, 1-propenyl, 1-butenyl, 2-butenyl, etc.), or an aryl group including substituted aryl (e.g., phenyl, naphthyl, tolyl, xylyl, halophenyl such as p-chlorophenyl, p-bromophenyl, 2,4-dichlorophenyl, alkoxyphenyl such as methoxyphenyl, etc.);

d. $R_4$ represents an alkyl group, preferably a lower alkyl group containing from 1 to 4 carbon atoms (e.g., methyl, ethyl, propyl, isopropyl, butyl, sec-butyl, isobutyl, tert-butyl, etc.);

e. $X_2$ represents an acid anion (e.g., halide such as chloride, bromide, or iodide, p-toluene sulfonate thiocyanate, sulfamate, perchlorate fluoborate, methylsulfonate, ethylsulfonate, fluorosulfonate, 2,4-dinitrobenzenesulfonate, etc.); and f. $Z_2$ represents the non-metallic atoms necessary to complete a heterocyclic nucleus of the type used in cyanine dyes containing 5 to 6 atoms in the heterocyclic ring, which nucleus can contain a second hetero atom such as oxygen, nitrogen, selenium or sulfur such as a thiazole nucleus (including substituted and unsubstituted benzothiazole and naphthazole nuclei and the like), e.g., thiazole, 4-methylthiazole, 4-phenylthiazole, 4,5-diphenylthiazole, 4-(2-thienyl)thiazole, benzothiazole, 4-chlorobenzothiazole, 4-methylbenzothiazole, 4-methoxybenzothiazole, 4-ethoxybenzothiazole, 4-phenylbenzothiazole, 5-chlorobenzothiazole, 5-bromobenzothiazole, 5-methylbenzothiazole, 5-methoxybenzothiazole, 5-ethoxybenzothiazole, 5-phenylbenzothiazole, 6-chlorobenzothiazole, 6-bromobenzothiazole, 6-methylbenzothiazole, 6-methoxybenzothiazole, 6-ethoxybenzothiazole, 5-methoxynaphtha[2,3-d]-thiazole, α-naphthothiazole, β-naphthothiazole, 5-nitrobenzothiazole, 6-nitrobenzothiazole, 5-chloro-6-nitrobenzothiazole, etc., an oxazole nucleus (including substituted and unsubstituted benzoxazole and naphthoxazole nuclei and the like), e.g., oxazole, 4-phenyloxazole, benzoxazole, 5-chlorobenzoxazole, 5-methylbenzoxazole, 5-bromobenzoxazole, 5-methoxybenzoxazole, 5-ethoxybenzoxazole, 5-phenylbenzoxazole, 5-methoxynaphthoxazole, 5-nitrobenzoxazole, 6-nitrobenzoxazole, 5-chloro-6-nitrobenzoxazole, etc., a selenazole nucleus (including substituted and unsubstituted benzoselenazole and naphthoselenazole nuclei and the like), e.g., selenazole, 4-methyl-selenazole, 4-nitroselenazole, 4-phenyl-selenazole, benzoselenazole, 5-chlorobenzoselenazole, 5nitrobenzoselenazole, 6-chlorobenzoselenazole, 5-chloro-6-nitrobenzoselenazole, 6-nitrobenzoselenazole, naphtho[2,1-d]selenazole, nitro group substituted napthoselenazoles, etc., a thiazoline nucleus, e.g., thiazoline, 4-methylthiazoline, 4-nitrothiazoline, etc., a 2-pyridine nucleus, e.g., 2-pyridine, 5-methyl-2-pyridine, etc., a 4-pyridine nucleus, e.g., 4-pyridine, 3-methyl-4-pyridine, nitro group substituted pyridines, etc., an imidazole nucleus, e.g., imidazole, 1-alkylimidazole, benzimidazole, 1-alkylbenzimidazole, 1-alkyl-1H-naphthimidazole, 1,3-dialkyl, 1,3-diaryl or 1-alkyl-3-arylimidazoles and benzimidazoles, such as 5-chloro-1,3-dialkylbenzimidazoles, 5-chloro-1,3-diarylbenzimidazoles, 5,6-dichloro-1,3-diarylbenzimidazoles, 5-methoxy-1,3-dialkylbenzimidazoles, 5-methoxy-1,3-diarylbenzimidazoles, 5-cyano-1,3-dialkylbenzimidazoles, 5-cyano-1,3-diarylbenzimidazoles, 1,3-dialkylnaphth[1,2,-d]imidazole, 1,3-diarylnaphth-[2,1-d]imidazole, etc., a quinoline nucleus, e.g., quinoline, 6-methylquinoline, 6-methoxyquinoline, 6-ethoxyquinoline, 6-chloroquinoline, 4-methoxyquinoline, 4-methylquinoline, 8-methoxyquinoline, β-methylquinoline, 4-chloroquinoline, 6-nitroquinoline, etc., a 3,3-dialkylindolenine nucleus, e.g., 3,3-dimethylindolenine, 3,3-dimethyl-5 or 6-nitroindolenine, 3,3-dimethyl-5 or 6-cyanoindolenine, a [4,5-b]quinoxaline nucleus (as described in Brooker and VanLare, U.S. Pat. No. 3,431,111), e.g., imidazo[4,5-b]-quinoxaline, 1,3-dialkylimidazo[4,5-b]-quinoxaline such as 1,3-diethylimidazo[4,5-b]-quinoxaline, 6-chloro-1,3-diethylimidazo[4,5-b]-quinoxaline, etc., 1,3-dialkenylimidazo[4,5-b]-quinoxaline such as 1,3-diallylimidazo[4,5-b]-quinoxaline, 6-chloro-1,3-diallylimidazo-[4,5,-b]quinoxaline, etc., 1,3-diarylimidazo-[4,5-b]quinoxaline such as 1,3-diphenylimidazo-[4,5-b]quinoxaline, 6-chloro-1,3-diphenyl-imidazo[4,5-b]quinoxaline, etc., a 3H-pyrrolo[2,2-b]pyridine nucleus, e.g., 3,3-dialkyl-3H-pyrrolo[2,3-b]pyridine such as 3,3-dimethyl-3H-pyrrolo[2,3-b]pyridine, 3,3-diethyl-3H-pyrrolo[2,3-b]pyridine, 1,3,3-trialkyl-3H-pyrrolo[2,3-b]pyridine such as 1,3,3-triethyl-3H-pyrrolo[2,3-b]pyridine, etc., or a thiazolo[4,5-b]quinoline nucleus, reference being made to Kendall and Stewart, U.S. Pat. No. 3,128,179, issued Apr. 7, 1964, column 3, line 27 through column 4, line 13 for specific useful examples of many of the nuclei referred to above.

In accordance with another embodiment of this invention, a process is provided for preparing compounds of formula I which comprises: reacting (a) a compound having the formula:

II. 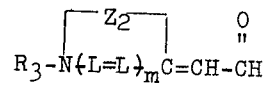

with (b) an alkylating agent.

In formula II above $R_3$, L, m and $Z_2$ have the same meaning as defined above.

The alkylating agent used in the above reaction can be any such agent which will react with the aldehyde group of the compounds represented by formula II. Examples of such agents include triethyloxonium fluoborate, trimethyloxonium fluoborate, methyl fluorosulfonate and methyl 2,4-dinitrobenzenesulfonate.

The acid anions represented by $X_2$ in formula I above are not limited to those resulting from the alkylation reaction. By known methods these anions can be exchanged for other anions such as those set forth above for $X_2$.

The alkylating agent described above is reacted with a formylmethylene substituted heterocyclic quaternary compound having formula II above. This reaction is advantageously conducted in a suitable solvent. The quantity of solvent is not critical although it is preferred to use sufficient solvent to provide a stirrable fluid reaction mixture. The quantity of solvent necessary for specific reactants can vary widely according to the property of the reactants themselves. Typically, solvent ratios can range from as little as one weight unit of solvent per weight unit of reactants to ten or more weight units of solvent per weight unit of reactants. Suitable solvents include halogenated alkanes such as dichloromethane, trichloromethane, tetrachloromethane, dibromomethane, iodomethane, dichloroethane, dibromoethane, chlorobromoethane, benzene, toluene, xylene, hexane, ether, tetrahydrofuran, and the like.

The reaction is suitably conducted at room temperature. However, elevated reaction temperatures (e.g., up to the boiling point of the solvent at atmospheric pressure) can be used to accelerate the reaction.

The reaction time must be of sufficient duration to allow the reaction to go to completion. If conducted at room temperature, the reaction can go to completion in as little as ten minutes. However, the reaction time can be as long as one to four or more days with some of the less reactive intermediates such as the compounds of formula II wherein $Z_2$ represents the atoms necessary to complete a desensitizing nucleus as, for example, 6-nitrobenzothiazole.

The formylmethylene substituted intermediates of formula II can be prepared by hydrolysis of the corresponding acetanilidovinyl or anilinovinyl substituted intermediates according to the method of Brooker, U.S. Pat. No. 2,165,692. Alternatively, the intermediates of formula II can be prepared by reacting the corresponding methyl-substituted quaternary salt with a complex formed by reaction of an organic acid halide and a dialkylformamide followed by hydrolysis. This method is the invention of Mee and Heseltine and is disclosed and claimed in British Pat. No. 1,191,798 patented Nov. 11, 1970.

In accordance with another embodiment of this invention carbocyanine dye intermediates are provided having the formula:

IV. 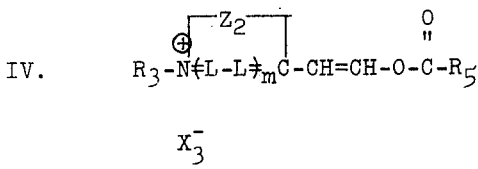

wherein $m$, $R_3$, L and $Z_2$ have the same meaning as set forth above; $R_5$ represents the remainder of an organic acid halide such as alkyl, preferably lower alkyl, containing from 1 to 8 carbon atoms (e.g., methyl, ethyl, propyl, isopropyl, butyl, sec-butyl, isobutyl, tert-butyl, pentyl, hexyl, heptyl, octyl, and the like) and aryl (e.g., phenyl, naphthyl, tolyl, xylyl, and the like); and $X_3$ has the same meaning as set forth above for $X_2$.

In accordance with another embodiment of this invention, a process is provided for preparing carbocyanine dye intermediates having formula IV above which comprises: reacting (a) a compound of formula II, with (b) an organic acid halide.

In accordance with the process of this invention, an organic acid halide is reacted with a formylmethylene substituted heterocyclic compound of formula II above. The organic acid halide can be any acid halide which reacts with the formylmethylene group to produce the corresponding ester. The acid halides are suitably either aliphatic acid halides (e.g., acetyl chloride, propanoyl chloride, butanoyl chloride) or aromatic acid halides (e.g., benzoyl chloride, 4-methylbenzoyl chloride) although aromatic acid halides are preferred. It has been found that compounds of formula IV wherein $R_5$ represents an aliphatic group (i.e., the compound was prepared from an aliphatic acid halide) are less stable than the corresponding aromatic acid halide derivatives and must be used very soon after preparation.

This reaction is advantageously conducted in a suitable solvent, preferably an anhydrous solvent to prevent hydrolysis of the acid halide. Suitable solvents include those set forth above for the preparation of compounds of formula I.

The quantity of solvent is not critical, although it is preferred to use sufficient solvent to provide a stirrable fluid reaction mixture. The ratio of solvent to reactants can vary widely according to the properties of the reactants. For example, the ratio of solvent can vary from as little as one or less weight unit of solvent per weight unit of reactant to 50 or more weight units of solvent per weight units of reactants.

The reaction temperature can vary widely. For example, from about 0°C up to about the reflex temperature of the solvent used. Preferably, the reaction is carried out at about room temperature (e.g., about 20° to about 25°C).

The reaction time must be of sufficient duration to allow the reaction to go to completion. If conducted in the preferred temperature range, the reaction is usually complete within an hour.

In accordance with another embodiment of this invention, carbocyanine dyes are provided which have first and second 5 to 6 membered heterocyclic nuclei joined together through an acyclic trimethine chain linkage, the trimethine chain linkage being substituted at a terminal carbon atom with an amino group or an amido group. The heterocyclic nuclei of carbocyanine dyes are well known in the art and usually contain at least one carbon atom and one nitrogen atom, the remaining atoms being selected from the group consisting of carbon, nitrogen, selenium, oxygen and sulfur.

Preferably, the carbocyanine dyes of this embodiment of this invention have the formula:

V. 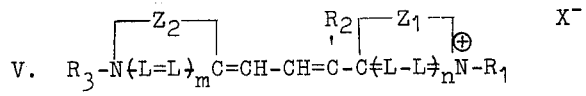

wherein $m$, $R_3$, L and $Z_2$ have the same meaning as defined above; $n$, $R_1$ and $Z_1$ have the same meaning as defined above for $m$, $R_3$ and $Z_2$ respectively; $R_2$ represents an amino group such as an arylamino group (e.g., anilino, p-toluidino, 2,4-dimethylanilino, etc.) or an N-lower alkyl, N-arylamino (e.g., N-methylanilino, N-ethylanilino, N-butylanilino, N-methyl-p-toluidino, etc.) or an amido group, for example, N-acyl-N-arylamido such as N-lower alkyl carbonyl-N-arylamido (e.g., N-acetanilido, N-butyranilido, N-aceto-p-toluidino, etc.); and X represents an acid anion such as defined above for $X_2$.

In accordance with another embodiment of this invention, a process is provided for preparing carbocyanine dyes having first and second 5 to 6 membered heterocyclic nuclei joined together through an acyclic trimethine chain linkage, the trimethine chain linkage being substituted at a terminal carbon atom with an amino group, an amido group, or a thio group, which process comprises: reacting (a) a first compound having a 5 to 6 membered heterocyclic nucleus containing at least one nitrogen atom, said nucleus being substituted in the $\alpha$- or $\gamma$-position relative to the nitrogen atom with a $\beta$-alkoxyvinyl group, with (b) a compound having a 5 to 6 membered heterocyclic nucleus containing at least one nitrogen atom, said nucleus being substituted in the $\alpha$- or $\gamma$-position relative to the nitrogen atoms with a thiomethyl group, an aminomethyl group, or an amidomethyl group.

Preferably, the carbocyanine dyes prepared by the process of this embodiment have formula V above wherein $R_2$ additionally represents a thio group such as arylthio (e.g., phenylthio, tolylthio, naphthylthio, etc.) which comprises: reacting (a) a compound having a formula I above, with (b) a compound having the formula:

VI. 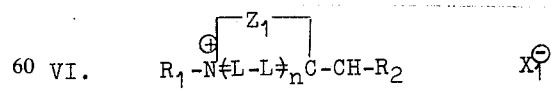

wherein $R_1$, $R_2$, $n$ and $Z_1$ have the same meaning as defined above and $X_1$ represents an acid anion as defined hereinabove for $X_2$.

In the carbocyanine dye represented by formula V, whether the acid anion represented by X is the acid anion $X_2$ from the compound of formula I or the acid anion $X_1$ from the compound of formula VI depends upon the various reactants. In addition, the acid anion of the dye can be exchanged by known methods for others such as those defined for $X_2$.

This reaction is advantageously conducted in a suitable solvent. The quantity of solvent is not critical, although it is preferred to use sufficient solvent to provide a stirrable fluid reaction mixture. The ratio of solvent to reactants can vary from as little as one or less weight units of solvent per weight unit of reactants to ten or fifteen or more weight units of solvent per weight unit of reactants. Suitable solvents include those commonly used in the art for cyanine dye synthesis, for example, acetic anhydride and acetonitrile can be used to achieve satisfactory results. However, to avoid acylation when $R_2$ represents a secondary amino group solvents such as acetic anhydride are preferably not used.

The reaction can be carried out over a wide range of temperatures although elevated temperatures are preferred to accelerate the reaction. Suitable temperatures range from room temperature up to about 150°C, although the reaction is conveniently conducted at the reflux temperature of the solvent.

The reaction time must be of sufficient duration to allow the reaction to go to completion. If conducted at the reflux temperature of the above mentioned solvents, the reaction is usually complete within ½ to 1 hour.

In accordance with another embodiment of this invention, a process is provided for preparing a carbocyanine dye having first and second 5 to 6 membered heterocyclic nuclei joined together through an acyclic trimethine chain linkage, said trimethine chain linkage being substituted at a terminal carbon atom with an amino group, an amido group, or a thio group, which process comprises: reacting (a) a carbocyanine dye intermediate having a 5 to 6 membered heterocyclic nucleus containing at least one nitrogen atom, said nucleus being substituted in the α- -or γ-position relative to the nitrogen atom with a β-acyloxyvinyl group, with (b) a cyanine dye intermediate having a 5 to 6 membered heterocyclic nucleus containing at least one nitrogen atom, said nucleus being substituted in the α- or γ-position relative to the nitrogen atom with a thiomethyl group, an aminomethyl group, or an amidomethyl group. Preferably, the carbocyanine dyes prepared by the process of this embodiment are dyes having formula V above, which process comprises: reacting (a) a compound of formula IV, with (b) a compound of formula VI. This reaction can be conducted under conditions similar to those described for the immediately preceding process for preparing compounds of formula V.

In accordance with another embodiment of this invention, a process is provided for preparing a carbocyanine dye having first and second 5 to 6 membered heterocyclic nuclei joined together through an acyclic trimethine chain linkage, said trimethine chain linkage being substituted at a terminal carbon atom with a formyl group, which process comprises: reacting (a) a carbocyanine dye intermediate having a 5 to 6 membered heterocyclic nucleus containing at least one nitrogen atom, said nucleus being substituted in the  - or γ-position relative to the nitrogen atom with a β-acyloxyvinyl group, with (b) a cyanine dye intermediate having a 5 to 6 membered heterocyclic nucleus containing at least one nitrogen atom, said nucleus being substituted in the α- or γ-position relative to the nitrogen atom with a formylmethylene group. Preferably, the carbocyanine dyes prepared by the process of this embodiment have the formula:

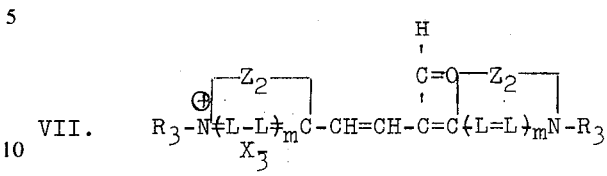

VII.

wherein each $m$, $R_3$, L, $Z_2$ and X can be the same or different and have the same meaning as hereinbefore described, which comprises: reacting (a) a compound of formula IV with, (b) a compound of formula II.

This reaction is advantageously conducted in a suitable solvent such as that used to prepare the compounds of formula II although other solvents such as acetonitrile are also suitable. The reaction conditions for the preparation of the carbocyanine dyes as described immediately above for the preparation of compounds of formula V are suitable for conducting the process of this embodiment of the invention.

The methods of this invention for preparing dye intermediates and carbocyanine dyes are especially useful since they allow the preparation of useful novel carbocyanine dyes.

The dyes (both known and novel) formed by the processes of this invention are highly useful in photographic silver halide emulsions. Some are useful in sensitizing negative silver halide emulsions and others are useful as spectral sensitizers and electron acceptors in direct-positive silver halide emulsions.

In the preparation of the silver halide photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the dyes of the invention include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pat. Nos. 3,142,568; 3,193,386; 3,062,674 and 3,220,844 and include the water insoluble polymers of alkyl acrylates and methacrylates, acrylic acid, sulfoalkyl acrylates or methacrylates, and the like.

The type of silver halide emulsions that can be sensitized with the new dyes of this invention include any of the conventional emulsions prepared with light-sensitive silver salts including silver chloride, silver bromide, silver iodide, silver chlorobromide, silver bromoiodide, silver chlorobromoiodide, etc. The concentration of the dyes in the emulsion can vary widely, e.g., from about 5 to about 100 mg per liter of flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

The emulsions can be forehardened by incorporating hardening agents in the emulsion during manufacture in such an amount as to increase the melting point of the emulsion in water to a temperature sufficiently above the temperature at which the emulsion is intended to be processed so as to prevent softening of the emulsion during processing. Suitable hardening agents include aldehydes such as formaldehyde and dialdehydes, such as glutaraldehyde, α-methylglutaraldehyde, β-methylglutaraldehyde, α, α-dimethylglutaraldehyde, α-methyl-β-ethoxyglutaraldehyde, α-(n-butoxy)glutaraldehyde, α-ethyl-β-ethoxyglutaraldehyde, β-(n-butoxy)glutaraldehyde, maleic dialdehyde, methylmaleic dialdehyde, butylmaleic dialdehyde, succinic dialdehyde, methoxysuccinic dialdehyde, methylsuccinic dialdehyde, α, α-dimethoxysuccinic dialdehyde, β-isopropoxysuccinic dialdehyde, α, α-diethylsuccinic dialdehyde. Reference is made to U.S. Pat. No. 3,232,764 for useful examples of aldehyde hardening agents.

The emulsions can be chemically sensitized by any of the accepted procedures. The emulsions can be digested with naturally active gelatin, or sulfur compounds can be added such as those described in Sheppard, U.S. Pat. No. 1,574,944; Sheppard and Punnett, U.S. Pat. No. 1,623,499 and Sheppard and Brigham, U.S. Pat. No. 2,410,689.

The emulsions can be treated with salts of the noble metals such as ruthenium, rhodium, palladium, iridium and platinum. Representative compounds arre ammonium chloropalladate, potassium chloroplatinate, and sodium chloropalladite which are used for sensitizing in amounts below that which produces any substantial fog inhibition as described in Smith and Trivelli, U.S. Pat. No. 2,448,060 and as antifoggants in higher amounts as described in Trivelli and Smith, U.S. Pat. Nos. 2,566,245 and 2,566,263.

The emulsions can be chemically sensitized with gold salts as described in Waller, Collins and Dodd, U.S. Pat. No. 2,399,083 or stabilized with gold salts as described in Damschroder, U.S. Pat. No. 2,597,856 and Yutzy and Leermakers, U.S. Pat. No. 2,597,915. Suitable compounds are potassium chloroaurite, potassium aurithiocyanate, potassium chloroaurate, auric trichloride, and 2-aurosulfobenzothiazole methochloride.

The emulsions can be chemically sensitized with reducing agents such as stannous salts (Carroll, U.S. Pat. No. 2,487,850), polyamines such as diethylenetriamine (Lowe and Jones, U.S. Pat. No. 2,518,698), polyamines such as spermine (Lower and Allen, U.S. Pat. No. 2,521,925), or bis(β-aminoethyl)sulfide and its water soluble salts (Lowe and Jones, U.S. Pat. No. 2,521,926).

The emulsions can contain other sensitizing dyes such as cyanine and merocyanine dyes such as those described in Brooker, U.S. Pat. Nos. 1,846,301; 1,846,302 and 1,942,854; White, U.S. Pat. No. 1,990,507; Brooker and White, U.S. Pat. Nos. 2,112,140; 2,165,338; 2,493,747 and 2,739,964; Brooker and Keyes, U.S. Pat. No. 2,493,748; Sprague, U.S. Pat. Nos. 2,503,776 and 2,519,001; Heseltine and Brooker, U.S. Pat. No. 2,666,761; Heseltine, U.S. Pat. No. 2,734,900; VanLare, U.S. Pat. No. 2,739,149; and Kodak Limited British Pat. No. 450,958.

The emulsions can also contain speed-increasing compounds of the quaternary ammonium type of Carroll, U.S. Pat. No. 2,271,623; Carroll and Allen, U.S. Pat. No. 2,288,226; and Carroll and Spence, U.S. Pat. No. 2,334,864; and the polyethylene glycol type of Carroll and Beach, U.S. Pat. No. 2,708,162.

The emulsion also can contain incorporated photographic couplers such as the conventional non-diffusible photographic couplers well known in the art. These couplers include pyrazolone couplers such as those disclosed in U.S. Pat. Nos. 2,343,702; 2,369,489; 2,436,130; 2,600,788; 2,006,759; 3,062,653; 3,311,476; and 3,419,391 and Belgian Pat. No. 698,354, the phenolic couplers disclosed in U.S. Pat. Nos. 2,367,531; 2,423,730; 2,474,293; 3,311,476; 3,419,390; 3,458,315; and 3,476,563 and the open-chain ketomethylene couplers disclosed in U.S. Pat. Nos. 2,206,142; 2,436,130; 2,728,658; and 3,408,149. The emulsion can also contain other couplers such as the development-inhibitor-releasing couplers disclosed in U.S. Pat. Nos. 3,227,554; and 3,148,062 and competing couplers disclosed in U.S. Pat. Nos. 2,808,329; 2,689,793; and 2,742,832. These photographic couplers can be added to the emulsion by a variety of known techniques. These techniques involve the use of certain organic solvents. These coupler solvents can either be of the low boiling or water soluble type which are removed from the emulsion by evaporation or washing following dispersion of the coupler and solvent in the emulsion or they can be of the high boiling organic crystalloidal type which remain incorporated in the emulsion. A description of the low boiling coupler solvents and the method by which they can be used to disperse photographic couplers is found in Vittum, et al., U.S. Pat. No. 2,801,710, particularly at column 2, lines 3 to 32. Also refer to U.S. Pat. No., 2,861,170; Fierke, et al., U.S. Pat. No. 2,801,171, particularly at column 10, lines 33 to 51. High boiling organic crystalloidal coupler solvents are those which are substantially water insoluble having a low molecular weight and a high boiling point (above about 175°C at atmospheric pressure). Examples of this type of coupler solvent include those shown in Fierke, U.S. Pat. No. 2,801,171, at column 10, lines 22 to 32; Julian, U.S. Pat. No. 2,949,360, at column 2, lines 3 to 18; and Jelley, et al., U.S. Pat. No. 2,322,027, at page 2, column 2, line 45 through page 3, column 2, line 6.

To prepare a gelatin-silver halide emulsion sensitized with one of the dyes of this invention, the following procedure is satisfactory. A quantity of the dye is dissolved in a suitable solvent and a volume of this solution containing from 5 to 100 mg of dye is slowly added to about one liter of a gelatin-silver halide emulsion. With most of the dyes, about from 5 to 20 mg of dye per liter of emulsion suffices to produce the maximum sensitizing effect with the ordinary gelatin-silver bromide (including bromoiodide and chlorobromide) emulsions. With fine-grain emulsions which include most of the ordinarily employed gelatin-silver chloride emulsions somewhat larger concentrations of dye can be necessary to obtain the optimum sensitizing effect. While this procedure has dealt with emulsions comprising gelatin, it will be understood that these remarks apply generally to any emulsions wherein part or all of the gelatin is substituted by another suitable hydrophilic colloid such as previously mentioned. It will also be understood that the above description is intended to be illustrative and should not be construed as limiting our invention in any sense since it is apparent that the new dyes can be incorporated by other methods in many of the photographic silver halide emulsions and hydrophilic colloid layers customarily employed in the art. For instance, the dyes can be incorporated by bathing a plate or film bearing an emulsion layer in a solution of one of the dyes in an appropriate solvent.

The above described emulsions can be coated on a wide variety of photographic emulsion supports. Typical supports include cellulose nitrate film, cellulose acetate film, polyvinyl acetal film, polystyrene film, poly(ethylene terephthalate) film, polyethylene film, polypropylene film, and related films of resinous materials, as well as paper, glass and others.

In the following examples which further illustrate the invention, Examples I and II demonstrate the preparation of dye intermediates of formula I, Examples III through V illustrate the preparation of dye intermediates of formula IV, Example VI illustrates the preparation of a carbocyanine dye of formula V and Examples VII and VIII illustrate the preparation of carbocyanine dyes of formula VII.

The following examples are included for a further understanding of the invention.

EXAMPLE I 2-(2-Ethoxyvinyl)-3-methylbenzothiazolium fluoborate

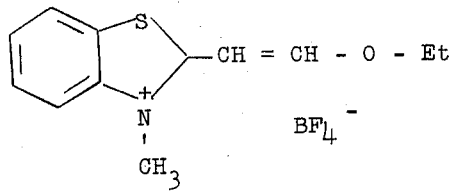

2-Formylmethylene-3-methylbenzothiazoline (Intermediate A below) (1.90 g, 0.0100 mole) and triethyloxonium fluoborate (2.00 g, 0.0105 mole) are mixed in dichloromethane (10 ml) at room temperature. The resulting precipitate is filtered after 10 minutes and dried to give 2.20 g (72 percent yield) of product, melting point 185°–186°C.

Intermediate A

2-Formylmethylene-3-methylbenzothiazoline is prepared as follows: phosphorous oxychloride (46 g, 0.30 mole) is dissolved in N,N-dimethylformamide (70 ml) at room temperature and the resulting solution is added dropwise over a 15 minute period to a solution of 2,3-dimethylbenzothiazolium iodide (88.1 g, 0.300 mole) dissolved in N,N-dimethylformamide (300 ml) previously heated to 70°C. The reaction mixture is stirred on a steam bath for 1 hour, cooled and poured into methanol (1300 ml) containing sodium perchlorate (50 g). The resulting yellow solid is filtered and dried to yield 100 g dried weight. The dried material is stirred with a mixture of 1,000 ml of chloroform and 500 ml of 20 percent aqueous sodium hydroxide solution at gentle reflux for 17 hours. The mixture is allowed to stand until separation occurs. The chloroform layer is recovered, washed with water, dried and the chloroform removed by evaporation. Upon addition of petroleum ether to the residue, 25.0 g (44 percent yield) of a crystalline product, melting point 97°–99°C is obtained.

EXAMPLE II 2-(2-Ethoxyvinyl)-3-ethyl-6-nitrobenzothiazolium fluoborate

3-Ethyl-2-formylmethylene-6-nitrobenzothiazoline (1.25 g, 0.050 mole) and triethyloxonium fluoborate (1.05 g, 0.055 mole) are mixed in dichloromethane (10 ml) and allowed to stand for 4 days at room temperature. Ether (10 ml) is added and the product obtained by filtering is dried to yield 1.67 g (91 percent yield), melting point 175°–177°C.

EXAMPLE III 2-(2-Benzoyloxyvinyl)-3-methylbenzothiazolium chloride

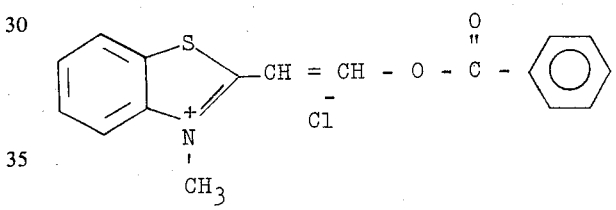

2-Formylmethylene-3-methylbenzothiazoline (Intermediate A from Example I) (3.80 g, 0.020 mole) dissolved in tetrahydrofuran (40 ml) is added over a 5 minute period dropwise to a stirred solution of benzoyl chloride (3.1 g, 0.022 mole) dissolved in ether (200 ml) at room temperature. Stirring of the mixture is continued for an additional 20 minutes and the solid product is recovered by filtration. The vacuum dried product, 6.0 g (91 percent yield), melting point 113°–115°C (dec.), is stored in a nitrogen atmosphere.

EXAMPLE IV 2-(2-Benzoyloxyvinyl)-5-chloro-3-methylbenzothiazolium chloride

5-Chloro-2-formylmethylene-3-methylbenzothiazoline (prepared in a manner similar to Intermediate A of Example I) (1.12 g, 0.005 mole) dissolved in chloroform (20 ml) is added over a 5 minute period to a stirred solution of benzoyl chloride (0.77 g, 0.0055 mole) dissolved in tetrahydrofuran at ice bath temperature. Stirring is continued for an additional 20 minutes at room temperature and the solid product is recovered by filtration. The product is washed several times with ether and dried under vacuum to yield 1.23 g (65 percent yield), melting point 127°–128°C (dec.).

EXAMPLE V 2-(2-Benzoyloxyvinyl)-3-ethylbenzoselenazolium chloride

3-Ethyl-2-formylmethylenebenzoselenazoline (prepared in a manner similar to Intermediate A of Example I) (1.26 g, 0.0050 mole) dissolved in chloroform (10 ml) is added dropwise over a 5 minute period to a stirred solution of benzoyl chloride (0.77 g, 0.0055 mole) dissolved in tetrahydrofuran (50 ml) at ice water temperature. Stirring is continued for an additional 30 minutes at room temperature and the solid product recovered by filtration. The product is washed several times with ether and dried under vacuum to yield 1.75 g (89 percent yield), melting point 125°–127°C (dec.).

EXAMPLE VI

8-Anilino-3'-ethyl-3-methyl-6'-nitrothiacarbo-cyanine iodide

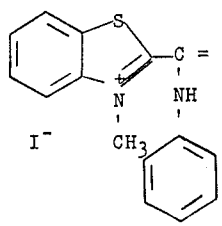

2-(2-Ethoxyvinyl)-3-ethyl-6-nitrobenzothiazolium fluoborate (prepared in Example II) (0.92 g, 0.0025 mole), 2-anilinomethyl-3-methylbenzothiazolium-p-toluene sulfonate (Intermediate B below) (1.06 g, 0.0025 mole) and triethylamine (0.50 g, 0.0050 mole) are stirred in acetonitrile (10 ml) at room temperature for one hour. The mixture is poured into ether, the solid recovered by filtration, washed with water, recovered again by filtration and dried. The crude dye thus obtained is converted to the iodide salt by dissolving in refluxing methanol and adding sufficient aqueous sodium iodide solution to accomplish the conversion. After recrystallization from methanol, 0.03 g (20 percent yield) of pure dye, melting point 229°–230°C (dec.) is obtained.

Intermediate B

2-Anilinomethyl-3-methylbenzothiazolium-p-toluene sulfonate is prepared by heating 2-anilinobenzothiazole (Intermediate C below) (7.1 g, 0.030 mole) and methyl-p-toluene sulfonate (5.5 g, 0.030 mole) together on a steam bath for 4 hours. Ether is added to the resultant glassy solid which is then broken up after which the ether is decanted. Thereupon acetone is added to the glassy solid and the mixture is refluxed until the solid is converted to light yellow crystals. After cooling the product is filtered, washed with acetone and dried to yield 4.5 g (36 percent yield) of the quaternary salt having a melting point of 191°–193°C.

Intermediate C

2-Anilinomethylbenzothiazole is prepared by heating a mixture of cyanomethylaniline (19.8 g, 0.150 mole) and o-aminothiophenol (19.7 g, 0.157 mole) and diphenyl ether (75 ml) on a steam bath for 6 hours. To the cooled mixture ether is added and the resulting solution is washed first with 10 percent aqueous sodium hydroxide and then with water. The solution is dried over anhydrous sodium sulfate, the diethyl ether evaporated and 24.5 g (68 percent yield) of the product is isolated from the dipehnyl ether by distillation (boiling point 164°–167°C at 0.075 ml Hg).

When suitable intermediates are substituted for the 2-(2-ethoxyvinyl)-3-ethyl-6-nitrobenzothiazolium fluobrate and the 2-anilinomethyl-3-methylbenzothiazolium-p-toluene sulfonate in Example VI the following dyes are obtained:

8-phenylthio-3,3'-diethyloxacarbocyanine iodide;
8-N-methylanilino-3,3'-dimethylselenacarbocyanine iodide;
8-N-acetanilido-1,1'-dimethyl-4,5,4', 5'-dibenzothiacarbocyanine iodide;
8-anilino-3,3'-diethyl-oxazelenacarbocyanine iodide.

EXAMPLE VII 3,3'-Dimethyl-8-formylthiacarbocyanine iodide

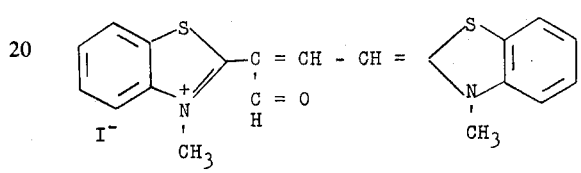

2-Formylmethylene-3-methylbenzothiazoline (Intermediate A of Example I) (0.48 g, 0.0025 mole) and 2-(2-benzoyloxyvinyl)-3-methylbenzothiazolium chloride (prepared in Example III) are heated in N,N-dimethylformamide (10 ml) at reflux for 2 hours. The mixture is cooled, poured into excess ether, filtered and dried. The crude dye is purified by dissolving in refluxing ethanol, adding an aqueous solution of sodium iodide to the refluxing solution and allowing to cool. Recrystallization yields 0.35 g (35 percent yield) of pure dye, melting point 233°–234°C (dec.).

EXAMPLE VIII 3,3'-Diethyl-8-formylselenacarbocyanine chloride

3-Ethyl-2-formylmethylenebenzoselenazoline (see Example V) (1.26 g, 0.0050 mole) and benzoyl chloride (0.35 g, 0.0025 mole) in acetonitrile (15 ml) are heated at reflux for 5 minutes. The dye crystallizes from solution upon cooling and is purified by recrystallization from a mixture of acetonitrile and water to yield 0.80 g (61 percent yield) of pure dye, melting point 177°–179°C (dec.).

In the above Example VIII it will be noted that the acyloxyvinyl substituted intermediate such as that prepared in Example III is formed in situ from the formylmethylene intermediate and reacts immediately without being isolated with a second mole of the formylmethylene intermediate to yield the 8-formylcarbocyanine dye.

When the dye 3,3'-dimethyl-8-(N-methylanilino)-thiacarbocyanine iodide is added to a silver bromoiodide emulsion containing 0.77 mole percent iodide of the type described by Trivelli and Smith, *Photographic Journal*, 79, 330 (1939) at a concentration of 0.04 g of dye per mole of silver bromoidide, coated on a cellulose acetate film support at a coverage of 432 mg of silver per square foot, exposed on an Eastman 1B sensitometer and to a wedge spectrograph, processed for 3 minutes in Kodak Developer D-19, fixed, washed and dried, the dye sensitizes the silver bromoiodide emulsion up to 640 nm with a sensitization maximum at 590 nm. When 5'-chloro-3,3'dimethyl-8-phenylthiocarbocyanine-p-toluene sulfonate is added to the silver bromoiodide emulsion at a concentration of 0.04 g of dye per mole of silver bromoiodide in place of the dye previously used, coated, exposed and processed in a similar manner, the dye sensitizes the silver bromoiodide emulsion from 560 to 610 nm with a sensitization maximum at 580 nm.

When the dye 8-anilino-3'-ethyl-3-methyl-6'-nitrothiacarbocyanine iodide is added to a fogged direct-positive emulsion in a concentration of 800 mg per mole of silver, coated on a cellulose acetate film support, exposed on an Eastman 1B sensitometer to light from a tungsten source modulated by continuous wedge, developed for 6 minutes in an elon-hydroquinone developer, fixed, washed and dried, the dye is found to act as an electron acceptor.

Similar results are obtained when the dyes set forth in the last paragraph of Example VI are added to silver halide emulsions, coated, exposed and processed as described hereinabove.

The invention has been described in detail with particular reference to certain preferred embodiments thereof, but it will be understood that variations and modifications can be effected within the spirit and scope of the invention.

I claim:

1. A carbocyanine dye having the formula:

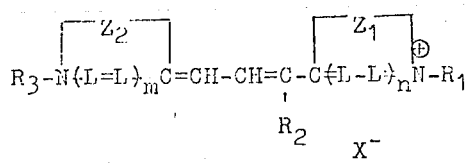

wherein $R_1$ and $R_3$ each independently represent a lower alkyl group, a lower alkenyl group or an aryl group of 6 to 10 carbon atoms: $R_2$ represents a substituent selected from the group consisting of anilino, p-toluidino, lower alkyl substituted anilino, N-lower alkyl anilino, N-lower alkyl-p-toluidino, N-lower alkyl carbonyl anilino, and N-lower alkyl carbonyl p-toluidino; each L represents a methine group; $m$ and $n$ each represent 0 or 1; $X^-$ represents an acid anion; and $Z_1$ and $Z_2$ each represent the non-metallic atoms necessary to complete a 5 to 6 membered heterocyclic ring selected from the group consisting of a thiazole nucleus, an oxazole nucleus, a selenazole nucleus, a thiazoline nucleus, a 2-pyridine nucleus, a 4-pyridine nucleus, an imidazole nucleus, a quinoline nucleus, a 3,3-dialkylindolenine nucleus, a (4,5-b)quinoxaline nucleus, a 3H-pyrrolo(2,3-b)-pyridine nucleus, or a thiazolo(4,5-b) quinoline nucleus.

2. The carbocyanine dye 8-anilino-3'-ethyl-3-methyl-6'nitrothiacarbocyanine iodide.

3. The process for preparing a carbocyanine dye having the formula:

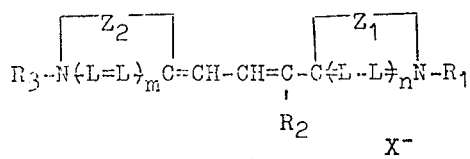

wherein $R_1$ and $R_3$ each independently represent a lower alkyl group, a lower alkenyl group or an aryl group of 6 to 10 carbon atoms; $R_2$ represents a substituent selected from the group consisting of anilino, p-toluidino, lower alkyl substituted anilino, N-lower alkyl anilino, N-lower alkyl-p-toluidino, N-lower alkyl carbonyl anilino, N-lower alkyl carbonyl p-toluidino, phenylthio, tolylthio and naphthylthio; each L represents a a methine group; $m$ and $n$ each represent 0 or 1; $X^-$ represents an acid anion; and $Z_1$ and $Z_2$ each represent the non-metallic atoms necessary to complete a 5 to 6 membered heterocyclic ring selected from the group consisting of a thiazole nucleus, an oxazole nucleus, a selenazole nucleus, a thiazoline nucleus, a 2-pyridine nucleus, a 4-pyridine nucleus, an imidazole nucleus, a quinoline nucleus, a 3,3-dialkylindolenine nucleus, a (4,5-b)quinoxaline nucleus, a 3H-pyrrolo(2,3-b)pyridine nucleus, or a thiazolo(4,5-b)quinoline nucleus which comprises: reacting in a solvent at a temperature of from room to about 150°C (a) a compound having the formula:

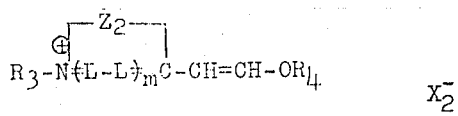

wherein $R_3$, L, m, and $Z_2$ have the same meaning as defined above, $R_4$ represents a lower alkyl group; and $X_2^-$ represents an acid anion, with (b) a compound having the formula:

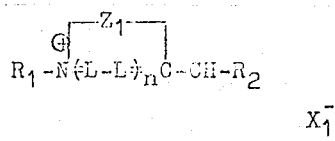

wherein $R_1$, $R_2$, $n$, and $Z_1$ have the same meaning as defined above; and $X_1^-$ represents an acid anion.

4. The process for preparing the carbocyanine dye 8-anilino-3'-ethyl-3-methyl-6'-nitrothiacarbocyanine iodide which comprises: reacting in a solvent at a temperature of from room to about 150°C (a) 2-(2-ethoxyvinyl)-3-ethyl-6-nitrobenzothiazolium fluoborate, with (b) 2-anilinomethyl-3-methylbenzothiazolium-p-toluenesulfonate.

5. The process for preparing a carbocyanine dye having the formula:

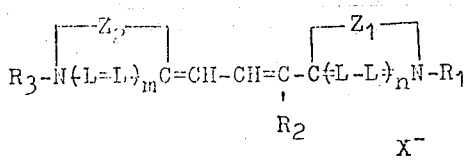

wherein $R_1$ and $R_3$ each independently represent a lower alkyl group, a lower alkenyl group or an aryl group of 6 to 10 carbon atoms; $R_2$ represents a substituent selected from the group consisting of anilino, p-toluidino, lower alkyl substituted anilino, N-lower alkyl anilino, N-lower alkyl-p-toluidino, N-lower alkyl carbonyl anilino, N-lower alkyl carbonyl p-toluidino, phenylthio, tolylthio and naphthylthio; each L represents a methine group; $m$ and $n$ each represent 0 or 1; $X^-$ represents an acid anion; and $Z_1$ and $Z_2$ each represent the non-metallic atoms necessary to complete a 5 to 6 membered heterocyclic ring selected from the group consisting of a thiazole nucleus, an oxazole nucleus, a selenazole nucleus, a thiazoline nucleus, a 2-pyridine nucleus, a 4-pyridine nucleus, an imidazole nucleus, a quinoline nucleus, a 3,3-dialkylindolenine nucleus, a (4.5-b)quinoxaline nucleus, a 3H-pyrrolo-(2,3-b)pyridine nucleus, or a thiazolo(4,5-b)quinoline nucleus which comprises: reacting in a solvent at a temperature of from room to about 150°C (a) a compound having the formula:

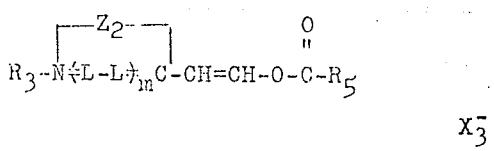

where $R_3$, L, $m$, and $Z_2$ have the same meaning as defined above; $X_3^-$ represents an acid anion; and $R_5$ represents a lower alkyl group or an aryl group of 6 to 10 carbon atoms, with (b) a compound having the formula:

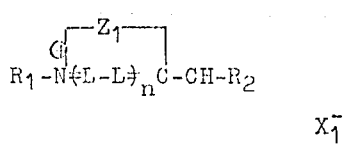

wherein $R_1$, $R_2$, $n$, and $Z_1$ have the same meaning as defined above; and $X_1^-$ represents an acid anion.

6. The process for preparing an 8-anilino-3,3′-dimethylthiacarbocyanine iodide which comprises: reacting in a solvent at a temperature of from room to about 150°C (a) 2-(2-benzoyloxyvinyl)-3-methylbenzothiazolium chloride, with (b) 2-anilinomethyl-3-methylbenzothiazolium-p-toluenesulfonate.

7. The process for preparing a carbocyanine dye having the formula:

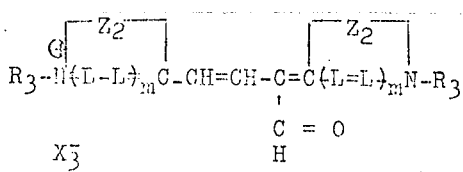

wherein each $R_3$ independently represents a lower alkyl group, a lower alkenyl group or an aryl group of 6 to 10 carbon atoms; each L represents a methine group; each $m$ independently represent 0 or 1; $X_3^-$ represents an acid anion; and each $Z_2$ independently represents the non-metallic atoms necessary to complete a 5 to 6 membered heterocyclic ring selected from the group consisting of a thiazole nucleus, an oxazole nucleus, a selenazole nucleus, a thiazoline nucleus, a 2-pyridine nucleus, a 4-pyridine nucleus, an imidazole nucleus, a quinoline nucleus, a 3,3-dialkylindolenine nucleus, a (4,5-b)-quinoxaline nucleus, a 3H-pyrrolo(2,3-b)pyridine nucleus, or a thiazolo-(4,5-b) quinoline nucleus which comprises: reacting in a solvent at a temperature of from room to about 150°C (a) a compound having the formula:

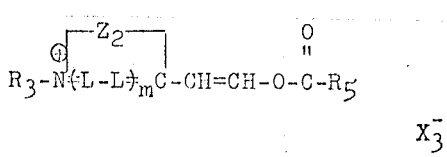

wherein $R_3$, L, $m$, and $Z_2$ have the same meaning as defined above; and $R_5$ represents a lower alkyl group or an aryl group of 6 to 10 carbon atoms, with (b) a compound having the formula:

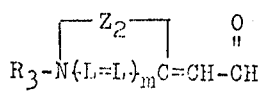

wherein $R_3$, L, $m$, and $Z_2$ have the same meaning as defined above.

8. The process for preparing the carbocyanine dye 3,3′-dimethyl-8-formylthiacarbocyanine chloride which comprises: reacting in a solvent at a temperature of from room to about 150°C (a) 2-(2-benzoyloxyvinyl)-3-methylbenzothiazolium chloride, with (b) 2-formylmethylene-3-methylbenzothiazoline.

9. A carbocyanine dye selected from the group consisting of 8-phenylthio-3,3′-diethyloxacarbocyanine iodide; 8-N-methylanilino-3,3′-dimethylselenacarbocyanine iodide; 8-N-acetanilido-1,1′-dimethyl-4,5,4′,5′-dibenzothiacarbocyanine iodide and 8-anilino-3,3′-diethyl-oxazelenacarbocyanine iodide.

* * * * *